G. W. BUGBEE.
Saw-Mandrels.

No. 146,648.    Patented Jan. 20, 1874.

Attest
Rob't Hunter
C. H. Berg

Inventor
George W. Bugbee
Per F. Millward
Attorney

UNITED STATES PATENT OFFICE.

GEORGE W. BUGBEE, OF CINCINNATI, OHIO, ASSIGNOR TO J. A. FAY & CO., OF SAME PLACE.

IMPROVEMENT IN SAW-MANDRELS.

Specification forming part of Letters Patent No. 146,648, dated January 20, 1874; application filed June 12, 1873.

*To all whom it may concern:*

Be it known that I, GEORGE W. BUGBEE, of Cincinnati, in the county of Hamilton and State of Ohio, have invented a certain new and useful Improvement in Saw-Mandrels, of which the following is a specification:

My invention consists, first, in a peculiar method of holding the sliding radial pins of an expansible mandrel for circular saws in their seats or sockets without any springs or other similar devices; second, of a device by which the mandrel may be held immovable when desired, for the purpose of unscrewing the nut to remove the collar, or for the purpose of adjustment.

Figure 1:
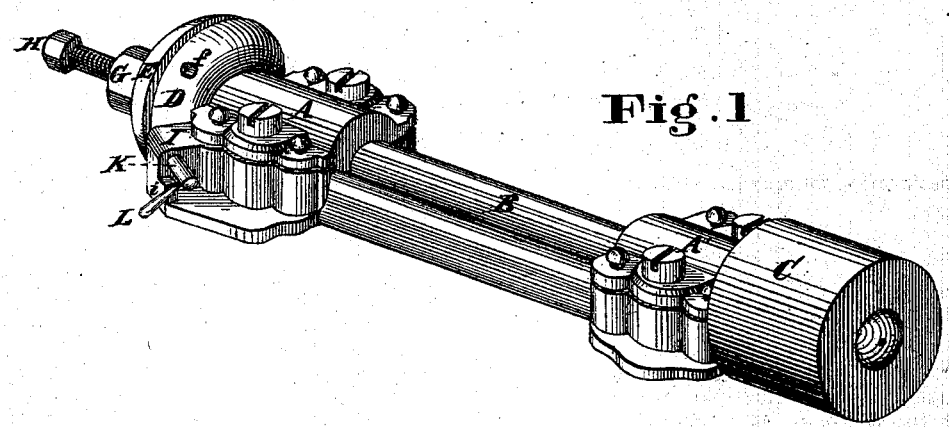
Figure 2:
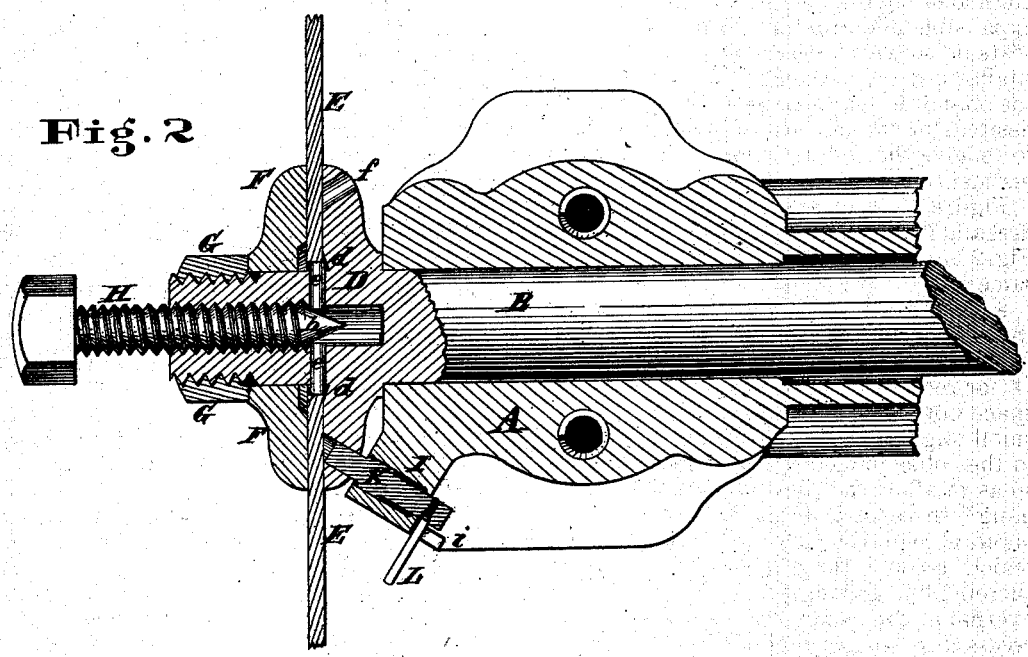

Figure 1 is a perspective view of a saw-mandrel and its bearings embodying my invention. Fig. 2 is a horizontal longitudinal section of the same.

A A' are the bearings, in which is journaled the saw-mandrel B, having at one end the driving-pulley C, and at the other the collar D, for receiving the saw-plate E, with proper space beyond for the washer F and nut G. A small angular groove or rabbet, $d$, is recessed in the collar immediately around the mandrel, so as to allow the face of the collar to "overhang" three cylindrical holes drilled in the mandrel equidistantly around its periphery, which receive three pins, $e$, moving freely therein, but having been forced in past the overhang, the heads of the pins engage in the recess $d$ in such a manner as to prevent the pins slipping out. The end of the mandrel is bored and screw-threaded to receive an adjusting-screw, H, having a conical end, $h$, upon which rest the inner ends of the pins $e$, which are protruded or retracted by the forward or backward movement of the screw H, so as to adjust themselves to the varying central bores of different saws, so as to hold them firmly and steadily at the same time that the device centers them truly upon the mandrel. The bearing A has at one side a projection formed in two steps, I $i$, and bored to receive a sliding pin, K, having a lug or handle, L, projecting at right angles to its axis. In the collar D are bored two circular apertures, $f$ $f$, fitted to receive the pin K, when protruded through the part I, and by this means prevent the rotation of the collar when it becomes necessary to unscrew the nut G, or adjust the screw H. When retracted, the pin K L is held from any interference with the collar by means of the handle L engaging behind the lower step $i$, as in Fig. 1, while, by partial rotation, it may be disengaged and protruded to engage in one of the apertures $f$ of the collar, as in Fig. 2. The apertures $f$ are bored at opposite sides of the collar, so as to insure a perfect balance of the mandrel, besides enabling the collar to be made fast in different positions.

I do not claim anything described in Patent No. 51,478.

I claim—

1. An expansible mandrel of the character described, in which the sliding pins $e$ are forced into their sockets, so that they will be held in place by the overhanging face of the collar D, substantially as specified.

2. The combination of bearing A, having the bored projection I $i$, collar D, having the aperture or apertures $f$, and sliding pin K L, arranged and operating substantially as and for the purpose specified.

In testimony of which invention I have hereunto set my hand.

GEO. W. BUGBEE.

Witnesses:
R. M. HUNTER,
W. H. DOANE.